JACOB GREEN, OF NORRISTOWN, PENNSYLVANIA.

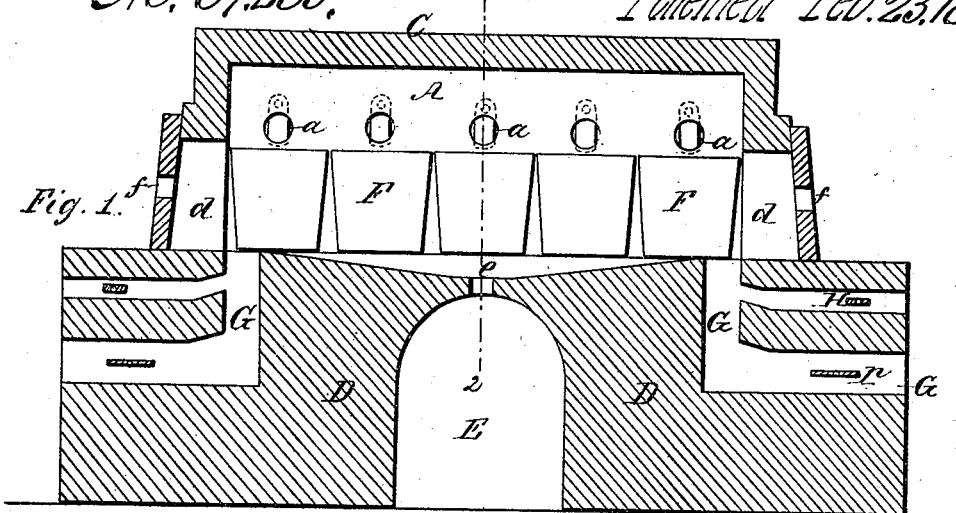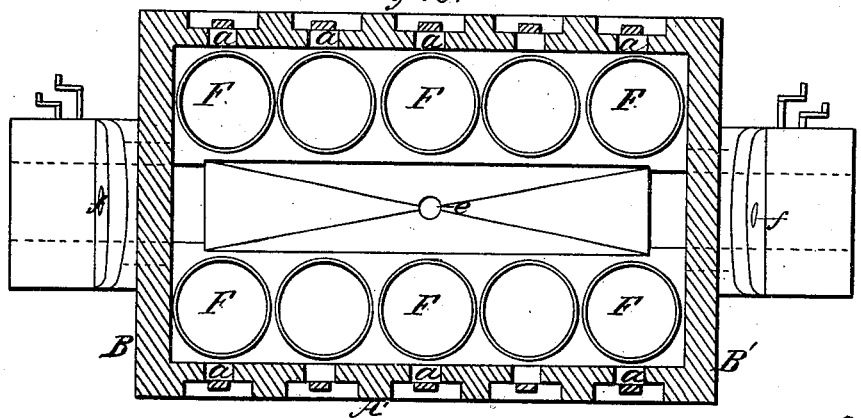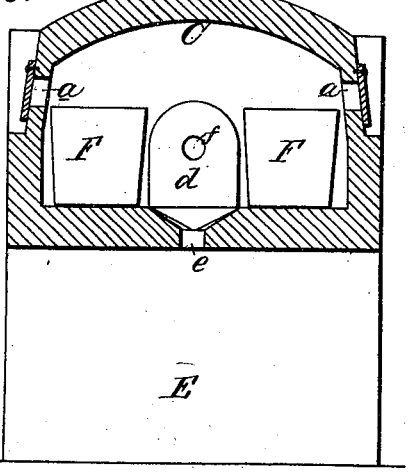

Letters Patent No. 87,255, dated February 23, 1869.

IMPROVED GLASS-FURNACE, KILN, &c.

The Schedule referred to in these Letters Patent and making part of the same.

*To all whom it may concern:*

Be it known that I, JACOB GREEN, of Norristown, Montgomery county, Pennsylvania, have invented an Improvement in Glass-Furnaces, Kilns, &c.; and I do hereby declare the following to be a full, clear, and exact description of the same.

My invention consists of a furnace, or kiln, in which are consumed gases composed of a volume or volumes of products of combustion, and decomposed steam under pressure, met, before entering the furnace, by a volume or volumes of compressed air, all substantially as described hereafter, so that flames of intense heat may pass into and pervade the whole interior of the furnace, which is thus free from all unconsumed products of combustion, and other foreign matters.

In order to enable others skilled in the art to make and use my invention, I will now proceed to describe its construction and operation, reference being had to the accompanying drawing, which forms a part of this specification, and in which—

Figure 1 is a vertical section of a glass-furnace, showing my invention applied to the same;

Figure 2, a sectional plan of the furnace; and

Figure 3, a transverse section on the line 1–2, fig. 1.

Similar letters refer to similar parts throughout the several views.

The furnace is, in the present instance, of oblong form, A and A' being the opposite side-walls, B and B', the end-walls, and C, the roof, the whole resting on the foundation D, in which is an arched opening, E, with a hole at the top, for the passage of such molten glass as may escape from the pots F F, two rows of which are arranged within the furnace, one near each side-wall of the same.

In each end-wall is an opening, d, through which the pots are introduced into and withdrawn from the furnace, these openings being provided with suitable detachable cover-plates f f.

In the side-walls are the usual working-holes a a, each provided with a stopper, which will allow more or less vent, as circumstances may suggest.

Within the furnace, and at each end of the same, is a vertical recess, G, with which communicate the horizontal flues H and I, each having a slight upward inclination near the recess G.

The flues H communicate with a gas-producer, in which steam and air combined, are forced upward through the fire, the steam being decomposed, uniting with the products of combustion, and forming, with the latter, a gas, which, when brought into contact with a supply of fresh air, burns with great intensity.

This gas is forced through the flues I, which are provided with suitable regulating-valves $h$, and fresh air, under pressure, passes through the flues H, which are also provided with appropriate regulating-valves or dampers.

The air and gas, both under pressure, meet, before entering the furnace, in the vertical recess G, and becoming intricately commingled there, produce an intensely hot flame, which, together with that at the opposite end of the furnace, pervades the whole interior of the same, the ignited gases being retained under pressure, by so adjusting the stoppers of the working-holes as to permit but slight vents.

One of the most important advantages of my invention is the freedom of the furnace from the dust, dirt, unconsumed products of combustion, and foreign particles, which, emanating from the fire-places of ordinary glass-furnaces, are apt to gain access to the glass, and injure the quality of the same.

In my improvement, the gaseous products of combustion cannot enter the furnace in an unconsumed, or partly unconsumed state, as they are met in the recess G by the supply of air under pressure, and thus converted into a flame of intense heat and great purity, before they enter the furnace.

The proper proportional quantities of compressed gas and air may be obtained by judicious adjustments of the valves or dampers in the passages H and I.

Although I have described my invention as applied to a glass-furnace, it will be evident that it is equally applicable to other furnaces, as well as to different kilns.

It is also apparent that the arrangement of flues, &c., for the gases and air, may be differently arranged, without departing from the main features of my invention. In all cases, however, the compressed air and gases should meet before entering the furnace.

I claim as my invention, and desire to secure by Letters Patent—

A furnace, or kiln, in which are consumed gases composed of a volume or volumes of products of combustion and decomposed steam, met, before entering the furnace, by a volume or volumes of compressed air, all substantially as and for the purpose herein set forth.

In testimony whereof, I have signed my name to this specification, in the presence of two subscribing witnesses.

JACOB GREEN.

Witnesses:
E. H. BAILEY,
C. B. PRICE.